(12) United States Patent
Hoekstra

(10) Patent No.: US 8,970,391 B2
(45) Date of Patent: Mar. 3, 2015

(54) TOILET MANAGEMENT SYSTEMS, METHODS, AND TECHNIQUES

(76) Inventor: Edo Vincent Hoekstra, Hafrsfjord (NO)

( * ) Notice: Subject to any disclaimer, the term of this patent is extended or adjusted under 35 U.S.C. 154(b) by 243 days.

(21) Appl. No.: 13/325,030

(22) Filed: Dec. 13, 2011

(65) Prior Publication Data

US 2012/0154169 A1    Jun. 21, 2012

Related U.S. Application Data

(60) Provisional application No. 61/423,587, filed on Dec. 15, 2010.

(51) Int. Cl.
| | | |
|---|---|---|
| *G08C 19/16* | (2006.01) | |
| *G01F 1/00* | (2006.01) | |
| *G06Q 10/00* | (2012.01) | |
| *G07F 17/18* | (2006.01) | |
| *G07F 9/02* | (2006.01) | |
| *G07F 11/00* | (2006.01) | |
| *G06Q 10/10* | (2012.01) | |
| *G06Q 10/06* | (2012.01) | |
| *E03D 5/10* | (2006.01) | |

(52) U.S. Cl.
CPC ........... *G06Q 10/00* (2013.01); *G07F 17/18* (2013.01); *G07F 9/026* (2013.01); *G07F 11/002* (2013.01); *G06Q 10/10* (2013.01); *G06Q 10/06* (2013.01); *E03D 5/105* (2013.01)
USPC ...................................... 340/870.01; 702/45

(58) Field of Classification Search
USPC ......................................... 340/870.1; 702/45
See application file for complete search history.

(56) References Cited

U.S. PATENT DOCUMENTS

| | | | |
|---|---|---|---|
| 6,211,787 B1 * | 4/2001 | Yoshiike et al. | 340/573.1 |
| 6,454,209 B1 * | 9/2002 | Bock et al. | 244/118.5 |
| 6,972,677 B2 * | 12/2005 | Coulthard | 340/531 |
| 7,242,307 B1 * | 7/2007 | LeBlond et al. | 340/573.1 |
| 8,364,546 B2 * | 1/2013 | Yenni et al. | 705/22 |
| 2002/0007510 A1 * | 1/2002 | Mann | 4/300 |
| 2002/0022896 A1 * | 2/2002 | Dugan | 700/83 |
| 2005/0171709 A1 * | 8/2005 | Nortier et al. | 702/45 |
| 2006/0067546 A1 * | 3/2006 | Lewis et al. | 381/124 |
| 2007/0008111 A1 * | 1/2007 | Tice et al. | 340/539.12 |
| 2008/0053532 A1 * | 3/2008 | Miller et al. | 137/386 |
| 2009/0031966 A1 * | 2/2009 | Kates | 119/719 |
| 2009/0119142 A1 * | 5/2009 | Yenni et al. | 705/7 |
| 2009/0151103 A1 * | 6/2009 | Gallu | 15/209.1 |
| 2009/0158836 A1 * | 6/2009 | Joyce et al. | 73/149 |
| 2009/0172035 A1 * | 7/2009 | Lessing et al. | 707/104.1 |
| 2011/0125520 A1 * | 5/2011 | Dhoble | 705/2 |

\* cited by examiner

*Primary Examiner* — Van T. Trieu
*Assistant Examiner* — Royit Yu
(74) *Attorney, Agent, or Firm* — Timberline Patent Law Group PLLC

(57) ABSTRACT

Toilet management systems and methods are provided. In an example system, a central monitoring component compiles usage information from sensors stationed at multiple toilet units and compiles a report of usage patterns. The usage patterns are networked to potential users via a user interface available on a webpage or mobile communications device. The user interface recommends which candidate toilet unit to use based on longest time since last use and/or least number of occupants since last maintenance or cleaning. The user interface may display two visual dials defining, for each toilet unit, amount of time elapsed since last occupancy and number of occupants since last maintenance or cleaning, and other metrics via bar charts. The example system extends a reservation system for a potential user to reserve a toilet unit based on the recommendation or the usage patterns provided over the network.

11 Claims, 3 Drawing Sheets

TOILET MANAGEMENT SYSTEMS, METHODS, AND TECHNIQUES

BACKGROUND

In public and private buildings and moving devices/apparatuses like busses and airplanes, and deployable sanitation units, toilet facilities are commonly deployed, as single units, or in groups of two or more units. The fact that a toilet area can consist of multiple toilet units, or that single (or multiple) unit toilets are located in different physical locations (floors, buildings, etc.), triggers questions and challenges for users, potential users, and maintainers of those toilets.

Toilet unit selection process has conventionally been based on trial-and-error, subjective reasoning, and guessing. Cleaning of the toilet units is done for every unit the same, which tends to lead to an efficiency breakdown as some toilet units may not have been used since the previous time at which they were cleaned or maintained. No feedback to maintenance and infrastructure is possible, and optimization methods are out of reach.

In the following detailed description, reference is made to the accompanying schematic drawings, which form a part hereof. The use of the same symbols in different drawings typically indicates similar or identical items. The illustrative embodiments described in the detailed description, drawings, and claims are provided merely for illustration and are not meant to be limiting. Other embodiments may be utilized, and other changes may be made, without departing from the spirit or scope of the subject matter presented here.

DETAILED DESCRIPTION

The present disclosure provides toilet management systems, methods, and techniques. While certain management systems, methods, and techniques are described for purposes of convenience of understanding, the disclosure is not intended to be limited by the exemplary descriptions provided herein.

According to an implementation, a toilet management system monitors the usage of the individual toilet units or groups of toilet units, such as the set of toilets in a public restroom. A toilet unit may include the plumbing fixture itself which is primarily intended for the disposal of human excreta. The toilet unit may additionally include other accessories or associated features, such as toilet paper, toilet paper dispensers, sanitary napkin receptacles, waste containers, deodorizers, the immediately surrounding floor, tiles, walls, doors, and so forth. In the case of toilet units deployed in public restroom facilities, the toilet unit may also include stall structures (i.e., walls, doors, and so forth).

The toilet management system may present the information monitored about the toilet unit to a toilet user/visitor (collectively referred to as a "user" or a "potential user"), a toilet cleaning or toilet maintenance company, and/or a building facility/maintenance office (collectively referred to as a "maintainer"), or other interested party. The user/visitor, cleaning/maintenance company, and/or building facility/maintenance office may use the information to make decisions regarding how to maintain or use the individual toilet unit or set of units.

Figure 1:
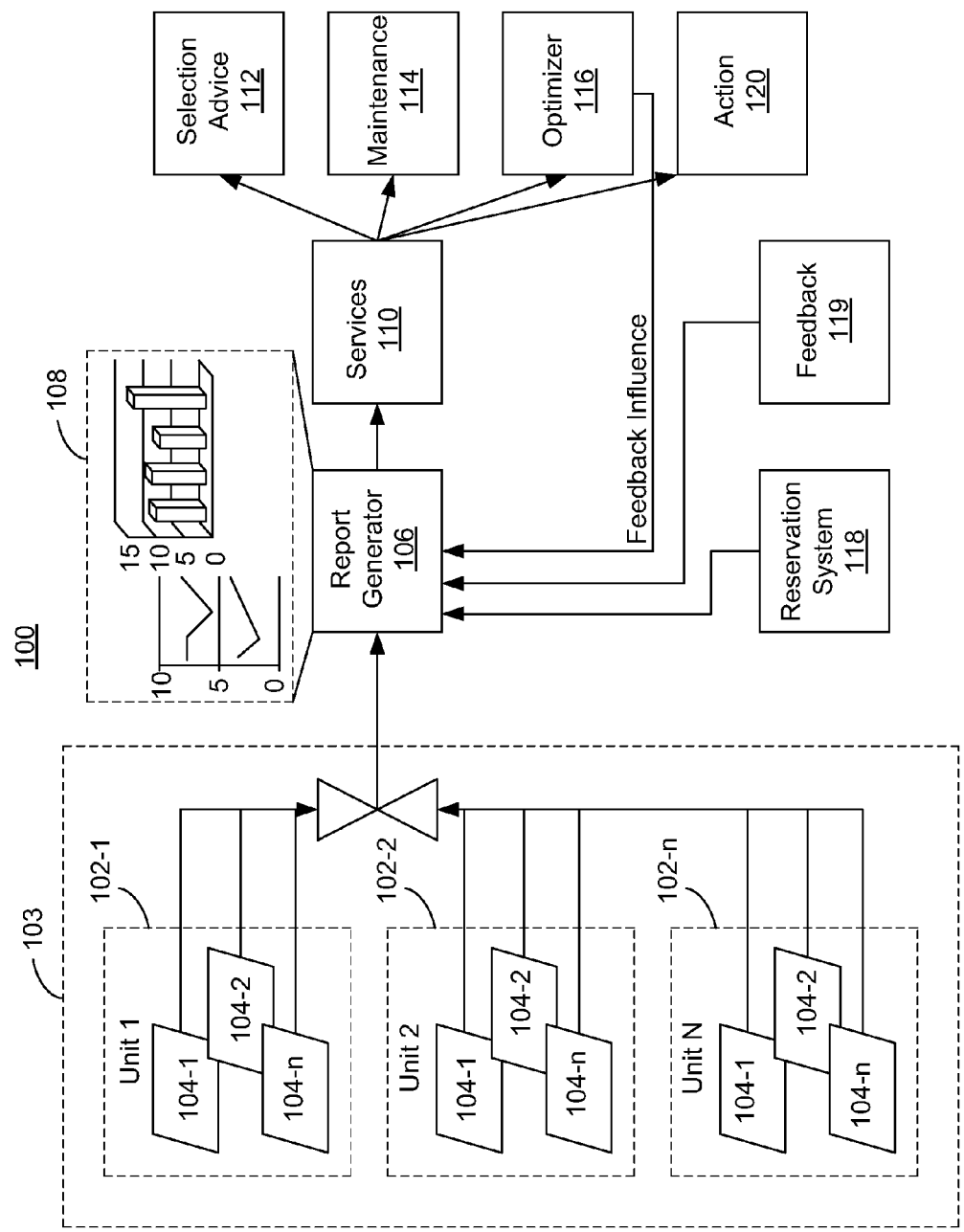
FIG. 1 shows a schematic of an exemplary toilet management system.

FIG. 1 shows one example toilet monitoring system 100. According to this implementation, one or more toilet units 102-1, 102-2, . . . 102-$n$ (collectively referred to as 102 herein), are monitored using a measuring component 103 of monitoring system 100. According to this implementation, one or more measuring device(s) 104-1, 104-2, . . . 104-$n$ (collectively referred to as 104 herein), are deployed in each of the individual toilet units 102 to determine toilet unit usage information related to the individual toilets. Additionally or alternatively, the measuring device(s) 104 may be deployed in a common area located near the toilet unit(s) 102, such as in a restroom that contains multiple toilet units 102. The usage information may include, but is not limited to:

the time that has elapsed since a previous toilet unit visit
the number of times the toilet unit has been used since its last cleaning
the duration of the previous toilet visit(s)
The environmental load of the previous toilet visit. Examples of environmental load may include, but are not limited to: odor, temperature, unswept toilet areas, chemicals for cleaning and or deodorizing the toilet unit or surrounding area, and so forth.

The toilet unit usage information may be sensed or measured using one or more sensors as will be set forth in more detail with reference to FIG. 3.

The one or more measuring devices 104 may be deployed in, on, under, or around each toilet unit 102 and may be one or plurality of the following devices: state detection devices (such as device that measures when a door is opened and/or closed), time measurement devices, movement detection devices, temperature measurement devices, odor measurement devices, audio and/or video devices, and so forth. Thus, the measurement unit may measure one or more aspect related to time, movement, temperature, odor, sound, and so forth, as set forth in more detail with regard to FIG. 3, and may store or send information related to the measurement as electronic data. For example, the measuring component 103, or each of toilet units 102 or each of the measuring devices 104, may collect data related to the information measured and may store this information in or on the measuring device 104 or on a hardware device (Not shown in FIG. 1, but provided by way of example as toilet unit measurement central processor 302 in FIG. 3) associated with the measuring device 104 or toilet unit 102. Additionally or alternatively, this information may be sent to another computing device, such as a centralized computing device and/or server that implements a reporting component, such as a report generator 106. Data may be transmitted electronically via a wired or wireless connection, which may be implemented using a network, such as the internet, a wide area network (WAN) and/or local area network (LAN).

The report generator 106 may generate or otherwise provide information related to measurements conducted in, on, under, or around the units using the measurement devices 104. For example, the report generator 104 may generate a report 108 that describes, sets forth, or in some form utilizes the relevant information measured by the measuring device(s) 104. The report generator 106 may create, update, or supplement a report, table, graph, database, textual description, or other suitable reporting mechanism in order to notify a maintainer or potential user of the status of the toilet unit 102 or related statistics. The reporting component may combine and consolidate the toilet unit usage information from multiple toilet units to generate the report 108 and/or a recommendation as set forth in more detail below. The report 108 may be provided in a human-readable or machine-readable format.

According to an implementation, the report 108 may be provided to, or may incorporate, a service component 110, which may direct, control, or select one or more services based on the report 108. For example, the service component 110 may recommend to a potential user a toilet unit to select via a selection advice component 112. The recommendation may be provided by the selection advice component 112 to a potential user via a user interface at or near the toilet unit 102 or may be provided via a communication to the user through a network, such as by an email, text message, webpage, smart phone application or other recommendation interface and may be provided on a potential user's computer, mobile communication device, or other suitable computing device. The selection advice may be based upon one or more criteria such as frequency of use of the toilet unit(s), frequency of cleaning of the toilet unit(s), length of time since last use of the toilet unit(s), and so forth.

Additionally or alternatively, the report 108 may provide information on the total environmental load of the available toilet units using a maintenance component 114. Environmental load may be based on frequency of use, odor, length of use by one or more users, number of flushes by each user, and so forth. The maintenance component 114 may provide this information, via a report and/or recommendation, to a maintainer or user of the toilet units to determine cleaning, maintenance, and other infrastructure requirements and/or scheduling.

Additionally or alternatively, the report 108 may provide information, such as optimization solutions for toilet unit usage or maintenance, using an optimization component 116 which may be used to influence the selection advice component 112 based on defined rules, such as business, economic, and/or efficiency based rules. For example, the report 108 may provide information that one of the toilet units, e.g. toilet unit 102-2, is not used frequently, perhaps because it is in a scarcely used part of a building. In one instance, the selection advice component might recommend toilet unit 102-2 to a potential user as that toilet unit is not frequented by other users. In another instance, the optimization component 116 may be used to determine that it is not economically efficient to recommend 102-2 perhaps because it is in a hard to access location and/or has not been used by any user since the last cleaning or maintenance. Thus, if no users use the toilet unit 102-2 between scheduled cleaning or maintenance, one or more scheduled cleanings or maintenance may be suspended, rescheduled, or cancelled due to the non-use. The optimization component 116 may thus be used to deter a user from using toilet unit 102-2 or to encourage the user to use, for example, toilet unit 102-1. The optimization component 116 may also be used to determine that a particular toilet unit has not been used and, thus, that maintenance and/or cleaning is not necessary.

The reporting component may derive an expected toilet occupancy based on the toilet unit usage information to recommend cleaning, maintenance, toilet unit availability, toilet unit desirability, or male-female distributions of toilet units based on the expected toilet occupancy. Expected toilet occupancy may be based on historical data, simulation models, extrapolation of data of similar toilet units, user input, established rules/laws, and so forth.

According to an implementation, toilet system 100 assists a toilet visitor, and potential user, who visits a toilet area. Thus, when a new toilet visitor enters the toilet area, the potential user may be directed regarding which toilet unit to choose, which toilet is the closest available, which toilet has been cleaned most recently, which toilet has been used the most since the last cleaning or maintenance, and so forth. The user may receive this information on a display or other indicator associated with the restroom or toilet unit or the user may receive this information by communicating physically or electronically with the maintainer of the toilet unit or by otherwise accessing the report or information generated using the report. For example, the user may access a website that posts the reports or provides other information, such as selection advice (e.g., "We recommend toilet unit 3 in the lobby as that unit was cleaned and stocked this morning and has only been used once today.").

According to an implementation, toilet system 100 assists a toilet maintainer in determining how to adjust the cleaning activities to the individual toilet unit cleaning requirements. For example, in a multi-story building, the toilet system 100 may notify a maintainer that none of the toilet units associated with a restroom on a given floor has been used since the last time it was maintained or cleaned. This may be the result of one or more tenants moving out or being temporarily vacant from the surrounding area. The maintainer may suspend, reschedule, or cancel further maintenance or cleaning until use is resumed.

According to an implementation, the number of toilets in use may be controlled to match the number of expected users. For example, in a stadium that can host different events with differing numbers of attendees, the use of certain toilet units can be controlled to address the number of users at the event. Thus, in a restroom with 15 toilet units in the upper portion of a sports stadium, 5 units may be indicated as "closed," "offline," or "unavailable" during smaller events so that users are directed to use one of the other 10 toilet units. The 5 unused toilet units may thus not require further cleaning after the event. Moreover, the suitable number of toilet units, in this example 10, may be made available as needed so as to avoid the formation of lines and so forth. Additionally or alternatively, the lids on the toilets or the stall doors on the toilet units may be physically locked in a manual or automated manner to prevent potential users from using or accessing the 5 "unavailable" units. Making certain units available or unavailable may be done locally or remotely, manually or automatically and may be modified as necessary. For example, manual or automatic modifications to the number of available toilet units may be made if the other available toilet units are all in use or out of order at a given time.

Such optimization of a restroom and toilet units can be made dependent on certain factors. Thus, toilet units may be optimized across areas, floors, buildings, genders, and so forth. The selection advice presented to potential users may be influenced by these factors to optimize the use of existing toilet units, driven by defined business reasons. For example, if only 3 persons are located on the third floor of a four story building, those persons may be directed to toilet units on the second or fourth floor. Additionally or alternatively, in an instance where only one gender is present, an opposite gender toilet unit may be used for that gender. For example, if a convention is held that is tailored toward women, 80-90% of the toilet units may be made available for women's use. The women may be directed to use the men's restroom via the report 108 and/or via the selection and/or optimization component 116.

By incorporating external behavior influences (like breakfast/lunch/diner schedules, airplane take-off/landing schedules, event or film start/pause/intermission/end schedules, gender presence/density, etc.), an expected toilet occupancy or use can be derived. This statistical prediction can be used as input to selection, cleaning, maintenance and optimization services.

According to an implementation, toilet visitors can use the management system to register for a specific toilet unit at a specific time/date using a reservation component 118. Thus, users may be able to ensure that they are the first to use a toilet unit after cleaning or maintenance. Alternatively, a user who is interested in using an otherwise crowded bathroom may reserve a specific toilet unit rather than stand in a line to use a random toilet unit. As yet another alternative, one or more users may be placed in a virtual queue in which they are notified, via a mobile device or other means when the next nearby toilet unit is available. According to this implementation, the toilet unit may be locked or secured until the next user in the queue arrives. In the case of a mobile device user, the potential user may receive a code via the user's mobile device to access the toilet unit. Moreover, the users and/or the maintainer may be made aware of the size of the queue. Thus, the user and/or the maintainer may monitor the waiting line of people based on those currently in the queue or signed up using the reservation system.

According to an implementation, a feedback component 119 may be provided so that a user may provide to a maintainer, building owner, tenant, or other interested party feedback on the observed quality of the toilet facilities, such as a toilet unit 102 or a restroom associated with the toilet unit 102. Additionally or alternatively, the user may comment upon, or rate, the toilet unit 102 or restroom. More particularly, the user may comment upon or rate the toilet unit 102 or the restroom based on its cleanness, the user "experience", performance of the toilet management system 100 itself, and so forth. The user may also report failures in the toilet management system, the toilet unit 102 or restroom, lack of toilet paper, malfunction of the toilet unit 102, need or desire for maintenance, call for emergency and/or medical help, and so forth. This feedback/survey can influence the report generator 106, and can be used for key performance indicators (KPI) as defined for or by the maintainers of the toilets. Thus, in an example where a maintainer is hired by a building owner or tenant to service, clean, and or maintain one or more of the toilet units and/or restrooms, the information provided through the feedback component may be used to rate the maintainer and determine whether the maintainer has met defined goals or obligations. The information from the feedback component 119 may similarly be used for the report 108 in order to direct the service component 110 regarding what selection advice to provide using the selection advice component 112, what maintenance to advise via the maintenance component 114, how to optimize toilet unit use using the optimization component 116, or what other action may be desired or required via an action component 120 as described in further detail below.

According to an implementation, an action component 120 may be incorporated to notify a maintainer that an action needs to be taken or to automatically take an action in response to information detected at the toilet unit or indicated by the report 108. The action component 120 may, for example, initiate the cleaning of the toilet, initiate a toilet unit maintenance, such as replacing the paper-roll, tissues, refilling soap or odor sprays, or the like, or the action component 120 may prompt a maintainer of the need for any other suitable maintenance/cleaning function.

The action component 120 may trigger an automated response, such as activating an odor spraying mechanism in the toilet unit to atomize the odor spray. Moreover, other components of the toilet unit may be configured to be automated. For example, the toilet paper dispenser may be configured to hold multiple rolls of toilet paper, with only one roll accessible to a toiler user at any time. The toilet paper dispenser may be configured to advance another roll of toilet paper when the current roll is sensed to no longer contain toilet paper. Additionally or alternatively, the action component 120 may notify the maintainer, who may then advance the next roll or refill the dispenser and so forth. The maintainer may perform the advancement manually at the dispenser or may control the dispenser remotely by manually or electronically activating a toilet paper roll advancement mechanism thus causing the advancement of the new roll.

Figure 2:
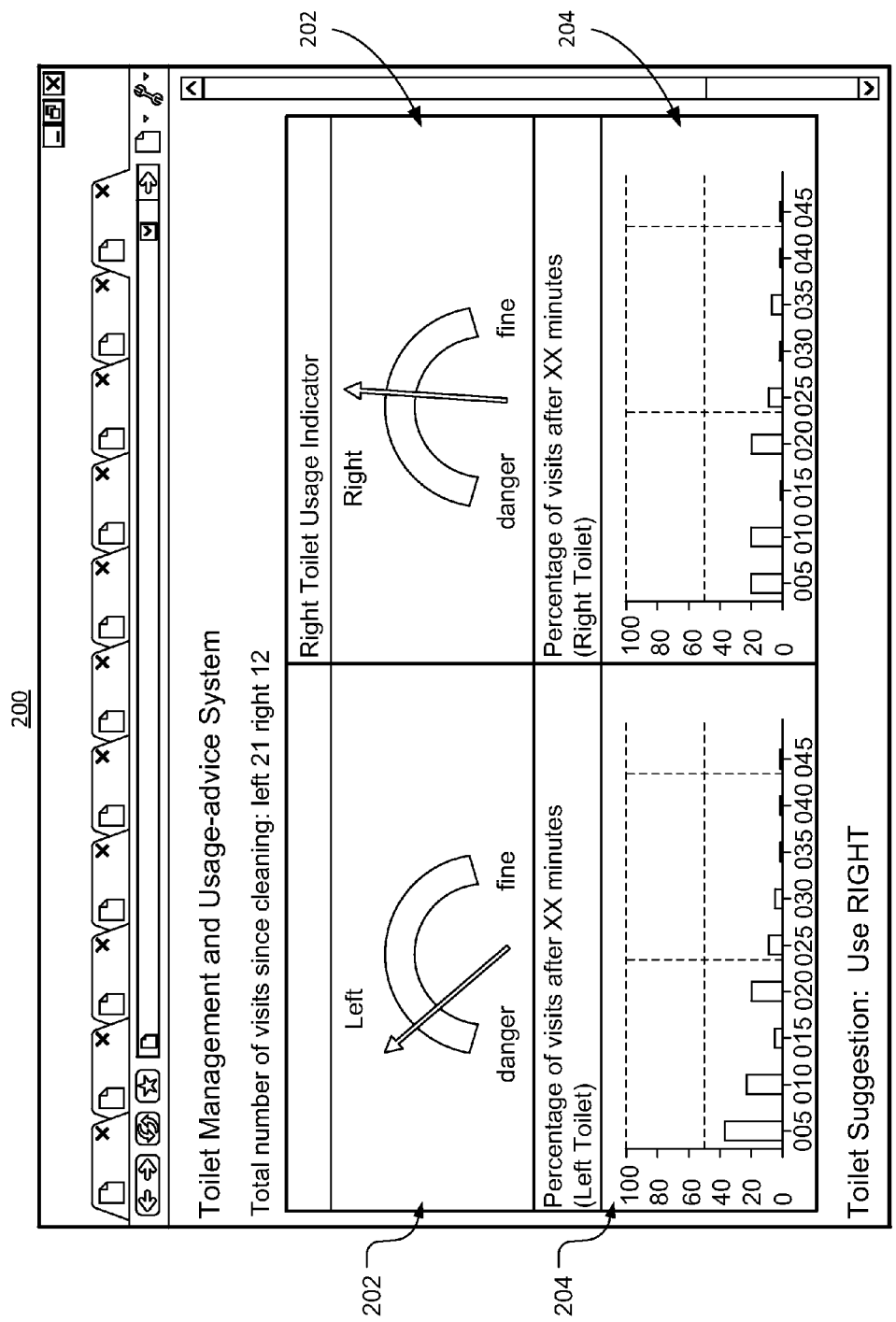
FIG. 2 shows an exemplary user interface for displaying the result of a report generator and the conclusions from a selection advice component.

One of the applications of the toilet management system is the usage-advice system service. An example is described with reference to FIGS. 1 and 2 to illustrate how such a system can be deployed.

According to this example, two toilet units 102-1 and 102-2 are present in a public restroom. A measuring device 104-1 is installed in each individual toilet unit (in this case, 2 toilet units are present). The measuring device 104-1 in this example is a movement or motion sensor which triggers a signal if an individual is using the toilet unit. The measuring device 104-1 sends a signal to the report generator 106, which generates statistics related to the use of the toilet units. In this example, the report generator 106 determines the time that has elapsed since the last time the toilet was occupied. The report generator 106 presents the statistics via a webpage 200, such as the one shown as an example in FIG. 2. The user interface of the webpage 200 shows two dials and two graphs as well as other textual information. The webpage indicates to potential users and maintainers the total number of visitors since the most recent cleaning or maintenance. This information may be useful to a user to decide which toilet unit to visit. The information, which may be provided using the maintenance component 116, can additionally or alternatively be used by a maintainer as an indicator to prioritize the cleaning activities of one toilet unit over the other. The two dials 202 contain indicators that indicate the amount of time that has elapsed since the last visit (or the total number of users since the last maintenance or cleaning) for that toilet unit. The bar graphs 204 show the % of people as a function of the time between two toilet visits for each of the toilet units. The selection advice component 112 proposes the toilet unit to use which has the longest time since it was last occupied and/or the least number of users.

Figure 3:
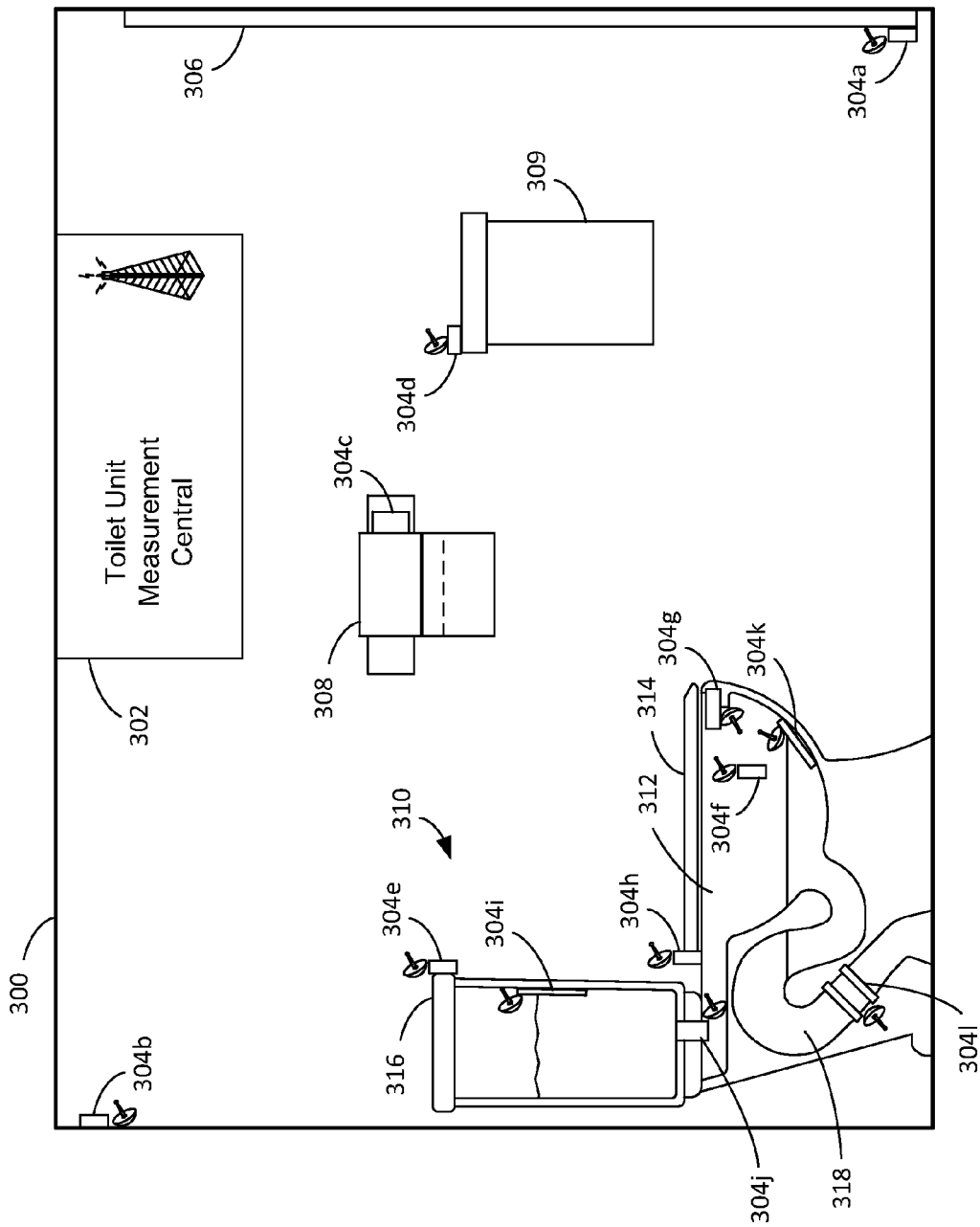
FIG. 3 shows exemplary measuring devices, or sensors, and sensor locations.

FIG. 3 shows an exemplary toilet unit 300 with a plurality of sensors 304 acting as measuring devices 104. One skilled in the art will recognize that each of these sensors 304 may be used individually or in combination. One or more of the sensors 304 may be in wired or wireless communication with a toilet unit measurement central processor 302. The toilet unit measurement central processor 302 may be located in or near the toilet unit 300 or may be located remotely from the toilet unit. The toilet measurement central processor 302 may communicate with the sensors 304 and or a central server (not shown) either through electrical wiring or using an RF, IR, or other signal, or using a network, such as a cellular network, a 3 G or 4 G network, WAN, LAN, WIFI, WIMAX or other suitable network.

According to an implementation, general features or states of the toilet unit 300 may be sensed or measured. For example, a door state sensor 304a may sense movement of a door 306 to measure usage of the toilet unit 300. The door state sensor 304a may sense change in an electrical charge, magnetic field, motion, light, or other similar state as will be known for detecting that the door has been opened and/or closed. A movement sensor 304b may additionally or alternatively be used within or around the toilet unit 300 to determine movement of the door 306 or movement of a user inside or around the toilet unit 304b. A toilet paper sensor 304c may additionally or alternatively be used to measure movement of a toilet paper roll 308, rolling motion of the toilet paper roll 308, light change from exposure of the sensor to light when the toilet paper roll 308 is empty, weight of the toilet paper roll 308, or other suitable state or change occurring with respect to the toilet paper roll 308. Additionally or alternatively, a waste container 309, such as a sanitary napkin dispenser or other general waste bin may be included and may have a waste container usage sensor 304d which may weigh, sense, or measure material weight, light changes, movement of a waste container door, odor, or other suitable feature to notify a potential user or a maintainer that the waste container is full, needs to be emptied, needs other maintenance, and so forth.

Additionally or alternatively, features of the toilet 310 itself may be sensed or measured. For example, an external odor sensor 304e and/or an internal odor sensor 304f may be used to sense an unpleasant odor in or around the toilet 310 and/or toilet unit 300. Additionally or alternatively, a temperature sensor 304g may be used within the bowl 312 of the toilet 310 to sense a temperature change caused by waste in the bowl 312 or heat from a user's body. A lid state sensor 304h may be used to determine the amount of time or number of times that the toilet lid 314 is placed in an "up" or "down" position. The lid state sensor 304h may be used in combination with the temperature sensor 304g so that the temperature may be sensed with reference to whether the lid is in an "up" or "down" position and whether a user is present.

Water transport and/or water level may additionally or alternatively be measured or sensed to measure usage or make recommendations to potential users and/or maintainers of the toilet unit 300. For example, a water level sensor 304i may be placed in the water storage tank 316 to measure or sense the number of times the water storage tank 316 has been filled and/or emptied or the level of water at any time in the water storage tank 316. Additionally or alternatively, the water level sensor 304i may sense an issue with the water storage tank 316, such as a leak or a failure to fill, a failure to drain, or a failure to complete a "flush" cycle. Additionally or alternatively, a water flux throughput sensor 304j may be utilized to sense or measure waterflow from the storage tank 316 to the bowl 312. A water level sensor 304k may be placed in the bowl 312 to measure or sense the number of times the bowl 312 has been filled and/or emptied and/or the level or water in the bowl 312 at any given time. Additionally or alternatively, the water level sensor 304k may sense an issue with the bowl 312, such as a leak or a failure to fill, a failure to drain, or a failure to complete a "flush" cycle. An outlet mass throughput sensor 304l may be utilized to sense or measure mass or fluid passing through the outlet pipe 318. Additionally or alternatively, outlet mass throughput sensor 304l may sense a clog in the outlet pipe 318, which may be used by the user or the maintainer to determine that the toilet 310 is unusable or may need maintenance. Moreover, other sensors may be implemented, such as the sensors described in U.S. Patent Application Publication Number 2003/0210140 and U.S. Pat. No. 7,242,307 or as otherwise conventionally known in the sensor and toilet arts.

Each of sensors 304a-304l may provide information to a user, potential user, or maintainer of toilet unit 300. As mentioned above, this information may be provided at or near the toilet unit 300 or may be delivered to a user on a mobile and/or remote computing device using a report such as that shown in FIG. 2. The information obtained using the one or more sensors may be collected and/or stored by the toilet unit measurement central processor 302. This information may be sent to another computing device, such as a computing device that implements the report generator 106, or the toilet unit measurement central processor 302 may itself implement the report generator 106.

Conclusion

Undoubtedly, numerous variations and modifications of the invention will become readily apparent to those familiar with toilet use, maintenance, and management. Although exemplary implementations have been described in language specific to structural features and/or methodological acts, it is to be understood that the system and method defined in the appended claims is not necessarily limited to the specific features or acts described. Rather, the specific features and acts are disclosed as exemplary forms of implementing the claims.

The foregoing detailed description has set forth various embodiments of the devices and/or processes via the use of block diagrams, and/or examples. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops. A typical data processing system may be implemented utilizing any suitable commercially available components, such as those typically found in data computing/communication and/or network computing/communication systems.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific example herein is also intended to be representative of its class, and the non-inclusion of such specific components (e.g., steps), devices, and objects herein should not be taken as indicating that limitation is desired.

What is claimed is:

1. A toilet management system comprising:
a toilet monitoring component for monitoring toilet unit usage information for multiple toilet units;
a reporting component for reporting the toilet unit usage information to a user;
an interface for communicating to the user through a network via one of an email, a text message, a webpage, and a smart phone application; and
a user interface to display a recommendation to the user indicating which of the multiple toilet units to use based on the toilet unit usage information;
wherein the reporting component combines and consolidates the toilet unit usage information from the multiple toilet units and generates the recommendation to the user regarding which toilet unit to use based on selecting a toilet unit associated with a longest time since the toilet unit was last occupied or selecting a toilet unit associated with a least number of occupants since a last maintenance or cleaning; and
wherein the reporting component provides the toilet unit usage information to the user interface to display the recommendation showing, for each toilet unit, two visual dials indicating an amount of time elapsed since a last occupancy of the toilet unit and a number of occupants since the last maintenance or cleaning.

2. The toilet management system of claim 1 further comprising an optimizer to provide optimization solutions for toilet unit usage or maintenance based on the toilet unit usage information and based on defined rules including business rules, economic rules, and efficiency rules.

3. The toilet management system of claim 1, wherein the reporting component derives an expected toilet occupancy based on the toilet unit usage information and recommends cleaning, maintenance, toilet unit availability, toilet unit desirability, or male-female distributions of toilet units based on the expected toilet occupancy.

4. The toilet management system of claim 1, wherein the reporting component is configured to accept feedback information from a toilet unit visitor and to provide the feedback information to the toilet unit maintainer.

5. The toilet management system of claim 1 further comprising a reservation component configured to accept a request from a future toilet unit visitor to reserve one of the toilet units based on the recommendation, and configured to reserve said one of the toilet units based on the request.

6. A toilet management method, comprising:
deploying one or more measuring devices to determine toilet unit usage patterns for multiple toilet units;
remotely monitoring the toilet unit usage patterns measured by the one more measuring devices; and
communicating a recommendation to a user interface of a user through a network via one of an email, a text message, a webpage, and a smart phone application indicating which of the multiple toilet units to use based on the toilet unit usage patterns;
combining and consolidating the toilet unit usage patterns from the multiple toilet units, and providing the recommendation to the user regarding which toilet unit to use based on selecting a toilet unit associated with a longest time since the toilet unit was last occupied or selecting a toilet unit associated with a least number of occupants since a last maintenance or cleaning; and
wherein providing a report regarding toilet unit usage patterns includes providing a recommendation to the user interface to display the recommendation by showing, for each toilet unit, two visual dials indicating an amount of time elapsed since a last occupancy of the toilet unit and a number of occupants since the last maintenance or cleaning.

7. The toilet management method of claim 6, wherein providing a report regarding toilet unit usage statistics comprises providing the toilet unit usage statistics to a maintainer of the one or more toilet units.

8. The toilet management method of claim 6, further comprising providing optimization solutions for toilet unit usage or maintenance based on the measured toilet unit usage statistics.

9. The toilet management method of claim 6, further comprising deriving an expected toilet occupancy based on the toilet unit usage patterns and recommending cleaning, maintenance, toilet unit availability, toilet unit desirability, or male-female distributions of toilet units based on the expected toilet occupancy.

10. The toilet management method of claim 6, further comprising accepting feedback information from a toilet unit occupant and providing the feedback information to the toilet unit maintainer.

11. The toilet management method of claim 6, further comprising accepting a request from a future toilet unit occupant to reserve one of the toilet units based on the recommendation; and
reserving said one of the toilet units based on the request.

* * * * *